United States Patent [19]

Mutzenberg et al.

[11] Patent Number: 4,563,278
[45] Date of Patent: Jan. 7, 1986

[54] BELT FILTER PRESS WITH RIBS FOR FILTERING A HEAVY LIQUID

[75] Inventors: Willi Mutzenberg, Kriegstetten; Albert Deuscher, Alle, both of Switzerland

[73] Assignee: Von Roll AG, Gerlafingen, Switzerland

[21] Appl. No.: 465,318

[22] Filed: Feb. 9, 1983

[30] Foreign Application Priority Data

Feb. 16, 1982 [CH] Switzerland ............ 962/82

[51] Int. Cl.⁴ .................................. B01D 33/04
[52] U.S. Cl. ............................. 210/401; 210/402; 162/351; 162/301
[58] Field of Search .............. 210/783, 784, 160, 210, 210/217, 248, 325, 326, 400, 401, 402, 386; 100/118, 211; 209/283, 307; 34/243 R; 162/351, 352, 301

[56] References Cited

U.S. PATENT DOCUMENTS

| | | | |
|---|---|---|---|
| 1,892,306 | 12/1932 | Hillier | 210/217 |
| 2,461,824 | 2/1949 | Komline | 210/401 |
| 2,557,440 | 6/1951 | Komline | 210/401 |
| 3,017,997 | 1/1962 | Hawkes et al. | 210/401 |
| 3,428,164 | 2/1969 | Lovegreen | 210/400 |
| 4,181,616 | 1/1980 | Bahr | 210/386 |
| 4,303,523 | 12/1981 | Ruppnig | 210/401 |

FOREIGN PATENT DOCUMENTS 0013549 5/1983 European Pat. Off. .

Primary Examiner—Richard V. Fisher
Assistant Examiner—Wanda L. Millard
Attorney, Agent, or Firm—Murray Schaffer

[57] ABSTRACT

A roller is provided with ribs directed outwardly from its face which permit the formation of cavities between the circumferential surface of the roller and the screen belts entrained thereon so that continuous channels are formed on the circumferential surface of the roller which conduct the filtrate axially outwards. The ribs are hollow tubular members having an opening along the surface of the roller which captures additional liquid, preventing it from falling back onto the belt, and allowing it to be conducted off and drained by allowing the liquid to flow laterally only.

8 Claims, 6 Drawing Figures

BELT FILTER PRESS WITH RIBS FOR FILTERING A HEAVY LIQUID

BACKGROUND OF THE INVENTION

The present invention relates to a belt filter press for filtering a heavy liquid such as sludge into liquid filtrate and a solid filter cake, and in particular to an improved rotating roller over which the belts of the press pass to squeeze the liquid from the sludge.

Various constructions of continuously operating belt filter presses are known. In order to separate the solid particles from heavy sludge, the latter is brought between two continuously circulating screen belts, between which the liquid therein is drained and a filter cake is formed on the solid particles on progressively moving the belts together. The filter cake is automatically removed from the screen belts at a discharge point, for further processing. The screen belts are normally guided over rotary rollers and as a result of the reversal of the belts, a pressing action is exerted on the filter cake located between them, so that better draining is obtained.

The filter cake obtained can be used for various purposes. However, in many cases it constitutes a nonreusable waste product, which must be eliminated, e.g. burnt in some way.

As the moisture still present in the filter cake is generally disadvantageous for any further treatment, every effort is made to improve the belt filter presses in such a way that the filter cake obtained has a minimum water or moisture content. For this purpose, it is possible to feed the screen belts over further pressing zones. However, this involves an increase in the size of the machine and an extension of the drive means, which has a disadvantageous effect on costs, so that such a solution is generally unacceptable.

The object of the present invention is to improve the degree of drainage in belt filter presses. The problem is to improve the drainage level offered by such a press without making the machine larger or more complicated.

It is a specific object of the present invention to provide an improved roller by which increased pressure can be exerted on the belts and by which the filtrate can be drawn off and eliminated quickly and with greater efficiency. These objects as well as others will be seen from the foregoing disclosure.

SUMMARY OF THE INVENTION

According to the present invention, this problem is solved in that the circumferential surface of the rotary roller is provided with ribs directed outwardly from the face of the roller and which permit the formation of cavities between the circumferential surface of the roller and the screen belts. The belts are supported on the ribs spaced with respect to the circumferential surface of the roller when guided around the latter. As a result, continuous channels are formed on the circumferential surface of the roller which channels conduct the filtrate outwards, i.e. counter to the faces of the roller. The filtrate can then be removed, without the revolving screen belts and consequently the filter cake being rewetted while on the roller during their continued movement.

Such rewetting particularly occurs in the case of conventional rollers, whose circumferential surface are merely perforated, so that the filtrate enters the roller and on the opposite side falls onto the screen belts and can consequently wet the filter cake.

Preferably, the ribs are hollow tubular members having an opening along the surface of the roller and which captures the liquid, preventing it from falling back onto the belt, and allowing it to be conducted off and drained by allowing the liquid to flow laterally only. Full details of the present invention are set forth in the following description and illustrated in the accompanying drawing.

DETAILED DESCRIPTION OF THE PREFERRED EMBODIMENTS

Figure 1:
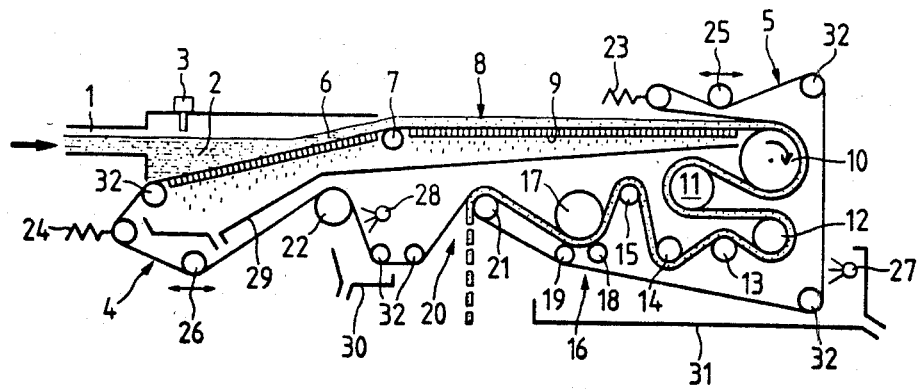
FIG. 1 a side elevational view, diagrammatically showing a belt filter press.

A conventional arrangement of a belt filter press as shown in FIG. 1, incorporated into a not shown machine frame, has an intake 1 through which the heavy liquid, e.g. sludge indicated by the arrow passes into a feed hopper 2, where it is initially treated in a conventional manner with a flocculating agent for the rapid flocculation of the solids. A level indicator 3 monitors the liquid level. Two continuously circulating porous belts 4, 5, are provided, the lower belt 4 forming the bottom of the feed hopper 2 on which the sludge is deposited and carried forward for cooperation with the upper belt 5. Through the outflow of filtrate through the lower belt, a filter cake 6 forms first on lower belt 4, which cake is broken up by a guide roller 7 midway along the run of the belt 4 for the better outflow of the filtrate. In a stabilizing zone 8, between the break-up roller 7 and the belt 5, the filter cake 6 is further drained and compacted. Grids or gratings 9 arranged below the lower belt 3 for support thereof continuously strip the filtrate and consequently bring about effective predraining prior to the squeezing between the belts 4 and 5. The filter cake 6 then passes into a wedge zone formed by screen belts 4, 5 and then into a pressing zone, where it is increasingly squeezed out against the surface of rollers 10, 11, 12. Following the guiding of screen belts 4, 5 over further rollers 13, 14, 15, the filter cake 6 is additionally drained in a high pressure zone 16 formed by a press drum 17 and two counter press rollers 18, 19. The screen belts 4, 5 are then separated from one another in an outlet 20 and are freed of filter cake by not shown strippers.

The screen belts 4, 5 are driven synchronously by means of two rubber-coated rollers 21, 22 with continuously adjustable belt speeds. Mechanical resilient belt tensioning means 23, 24 ensure a constant pretension of the two screen belts 4, 5 and protect them from overloading. The straight movement of the two belts 4, 5 is constantly monitored and is corrected by casters 25, 26. Washing means 27, 28 are responsible for the permanent cleaning of the respective screen belts 4, 5. The filtrate and wash water are collected in troughs 29, 30, 31 and are jointly or separately removed. Further guide pulleys 32 are used for guiding the two screen belts 4, 5.

Figure 2:
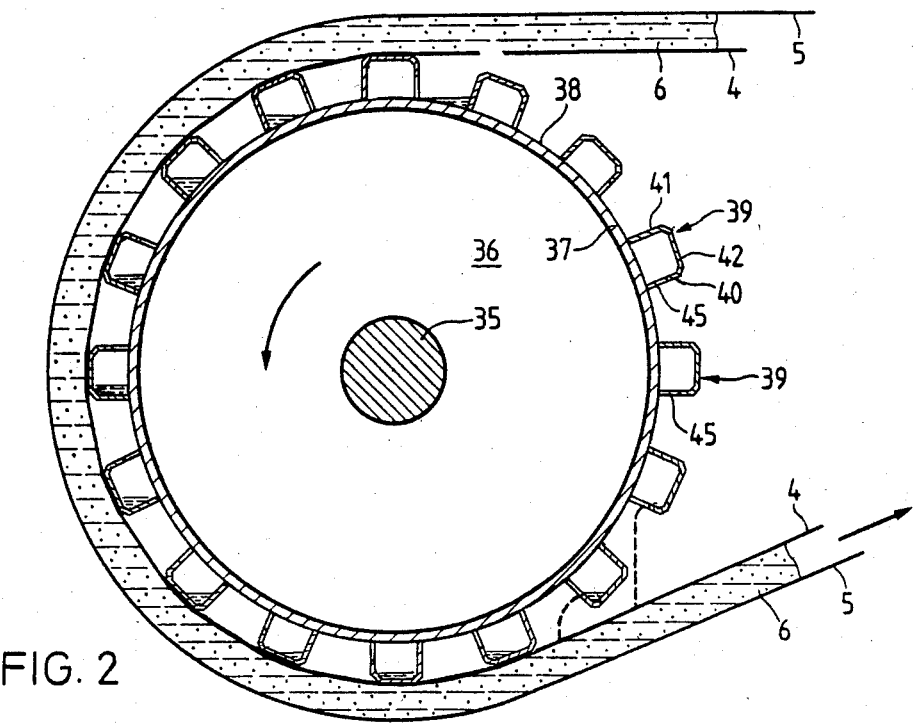
FIG. 2 is a cross-sectional view in accordance with the present invention showing hollow ribs, with the screen belts guided thereon.
Figure 6:
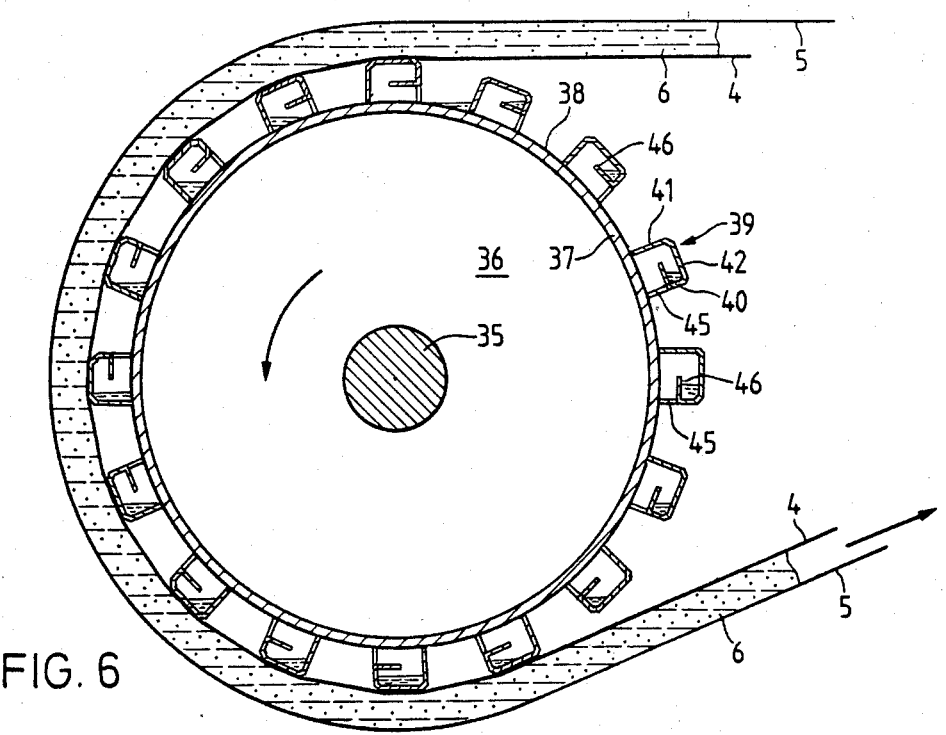
FIG. 6 is a section of a roller similar to that of FIG. 2, but with a further hollow rib embodiment according to the present invention.

One or more of the rollers 10 to 15 and 17 can be constructed according to FIG. 2 or 6. Such a roller has a shaft 35, at whose ends the roller is journaled in rotary manner in the machine frame. A plurality of supporting disks 36 are arranged in axially spaced manner on shaft 35, their number being, for example 3 to 5, a function of the roller width. To the supporting disks 36 is fixed a pipe 37, onto whose circumferential surface 38 are fixed, e.g. by welding, a plurality of elongated U-shaped hollow ribs 39 extending the width of the roller, the legs 40, 41 of the ribs are directed approximately radially, whilst the web 42, connecting legs 40 and 41, defines the outer circumference of the roller.

In use, the two screen belts 4, 5 and the intermediate filter cake 6 are wrapped or entrained around the outer circumference of the roller so that one of the belts contacts the webs 42. Assuming that the roller shown in FIGS. 2 and 6 is e.g. rollers 10 or 12, the inner screen belt supported on webs 42 of hollow ribs 39 is the lower belt 4 and the outer screen belt is upper belt 5. The two arrows indicate the rotational direction of the roller and the screen belts which in FIGS. 2 and 6 is illustrated as rotating in a direction opposite to the actual direction of rollers 10 and 12 in the arrangement of FIG. 1.

As the screen belts 4, 5 move around the rotating roller, the filter cake 6 located between belts 4, 5 is squeezed. The released liquid filtrate can flow both axially to the outside and radially to the inside. To ensure that the inwardly flowing filtrate does not flow back onto the abutting screen belt 4 and consequently back into the filter cake 6 during the further movement, it is collected in the spaces between and in the hollow ribs 39, which preferably but not necessarily extend longitudinally over the width of the pipe 37, so that the filtrate is guided laterally to the roller end faces, from where it is removed. For this purpose, a plurality of openings 45 are provided in each of the legs located on the side remote from the direction of movement of the roller (i.e. leg 40). The filtrate which does not flow outwardly of the ends between the ribs flows on the circumferential surface of the roller through the openings 45 into the interior of the hollow ribs 39 and from there flows out laterally, without being able to flow back onto the screen belt 4. Only on passing through the arc distance wrapping the roller do the openings 45 assume a position in the vicinity of the outgoing screen belts in which a return flow would be possible in the manner indicated by broken lines shown in FIG. 2. However, the quantity of filtrate which would flow back is very small, because during the training of the belts on the roller, most of the filtrate has flowed away sideways. However, the lateral outflow through the hollow ribs 39 can be further improved if the ribs were inclined from the radial direction of the shaft 35 or if they were arranged in a manner swept-back arcuately on the circumferential surface 38 of pipe 37.

A particularly effective removal of the filtrate and the prevention of return flow is achieved by the construction according to FIG. 6. The inwardly flowing filtrate, flows through openings 45 and is additionally held back by a collecting web 46 projecting into the interior of the hollow ribs 39. This web 46 holds the liquid even as the roller completes its full rotation so that any residual filtrate will only flow out of hollow rib 39 in the vicinity of the entrance of screen belts 4, 5 onto the roller, where it flows back into the spaces between the ribs 39 after passing beyond the roller apex. The web 46 extends generally parallel to or chordally to the surface of the pipe 37. This embodiment obviates virtually any return flow of filtrate to the screen belt 4.

Figure 4:
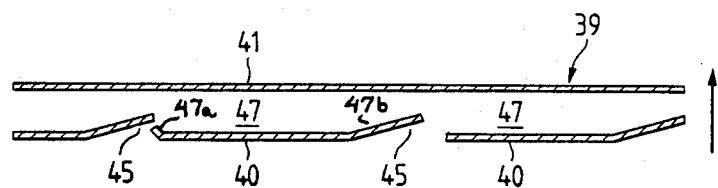
FIG. 4 is a section along line IV—IV of FIG. 3, showing another hollow rib construction, according to the present invention.
Figure 5:
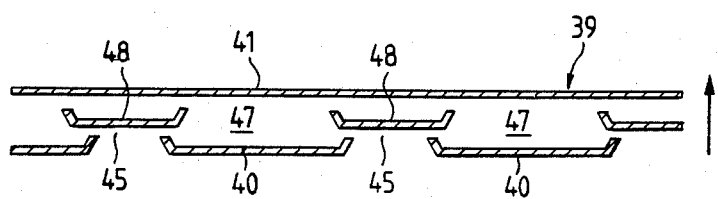
FIG. 5 is a section along line V—V of FIG. 3 showing still another hollow rib embodiment according to the present invention.

FIGS. 4 and 5 show further embodiments preventing the return flow of filtrate from openings 45 onto the screen belt 4. These drawings show a longitudinal section of a hollow rib 39 with continuous the leg 41 and the leg 40, provided with openings 45. Leg 40 is formed as a shallow trough 47 with an inward lip 47a and bent flap 47b between openings 45. These troughs 47 are able to move any residual filtrate without there being any return flow of filtrate onto belt 4.

In the construction of FIG. 5, openings 45 in legs 40 are protected by additional trough-like covers 48 within the ribs 39, whilst those portions of legs 40 located between openings 45 are shaped into shallow troughs 47 with small lips at each end. This construction is also able to substantially prevent any return flow of filtrate onto screen belt 4.

Figure 3:
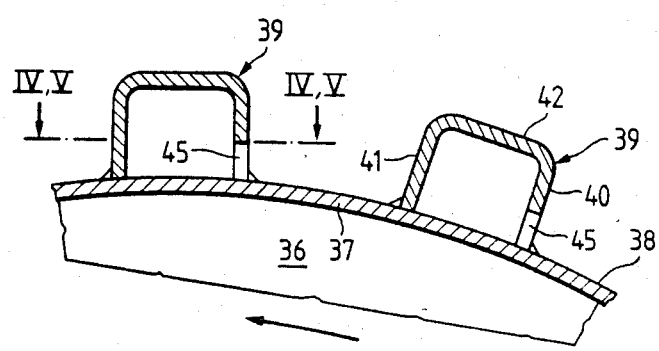
FIG. 3 is a partial section of the roller of FIG. 2 in large scale showing two hollow ribs.

FIG. 3 shows two hollow ribs 39 on a larger scale. It can be seen that the openings start directly at the inner circumferential surface 38, but their height is smaller than the height of legs 40. The width of openings 45 can be chosen at random. The remaining portion of leg 41 between two openings 45 must however withstand the squeezing force on the roller exerted by the two screen belts 4, 5. According to FIG. 6, the collecting web 46 extends over the entire length of a hollow rib 39 bridging both the openings 45 and the intermediate remaining portions between them. The arc distance between two hollow ribs 39 can be adapted to practical requirements and can be larger, smaller or the same as the width of web 42 of hollow ribs 39. The ribs are preferably, although not necessarily uniformly spaced about the circumference. Legs 40, 41 need not be arranged radially, and the hollow ribs 39 can also have a trapezoidal or some other cross sectional profile.

It is important that cavities are formed between the ribs in which the inwardly flowing filtrate can also collect and can drain off laterally to the outside. The ribs, particularly hollow ribs 39 need not extend over the entire width of the roller. Instead, they need only extend over part of the width and the width parts can be staggered relative to one another. This leads to a similar action obtained with sloping or arcuately swept-back ribs. The aforementioned rollers makes it possible to further increase the degree of drainage of a screen belt press, without increasing the size or degree of complication of the press.

In the case of the aforementioned roller, a perforated or screen plate can be placed on the outer circumference to be supported on webs 42 of hollow ribs 39. This also reliably prevents a return flow of filtrate while further supporting the belts.

One principle use of screen belt presses, in which the aforementioned rollers can be used, is the water removal and drainage of sludge, such as e.g. that from sewage treatment plants, but this in no way restricts the applications thereof.

Various modifications, embodiments and changes have been suggested. Other changes and modifications will be obvious to those skilled in this art. Accordingly, the present invention is intended as illustrative only and not as limiting of the present invention.

What is claimed is:

1. In a belt filter press for filtering a heavy liquid by separating the same into a filtrate and into a filter cake, having two endlessly circulating belts for receiving the heavy liquid which are guided by rotating pulleys over one or more rollers to squeeze liquid out and form a filter cake, the circumferential surface of at least one of the rollers being provided with spaced ribs directed outwardly from the surfaces of the roller and having an outer face on which said screen belt may be supported, the improvement wherein each of said ribs is formed of a hollow tubular member having a pair of spaced radial walls and a circumferential wall forming said outer face and a cross-sectional profile defining a cavity between the circumferential surface of the roller and the outer face of said rib, each tubular member having on the wall remote from the rotational direction of the roller means defining at least one opening adjacent to the circumferential surface of the roller whereby, on rotation of said roller, liquid can be received and retained within said tubular member during rotation of said roller about an arc subsequent thereto.

2. The improvement according to claim 1, wherein the ribs are inclined to the rotational axis of the roller.

3. The improvement according to claim 2, wherein the ribs extend over at least part of the width of the roller and are staggered relative to one another.

4. The improvement according to claim 2, wherein the ribs are inclined additionally to the rotational direction of said roller.

5. The improvement according to claim 1, wherein at least one of the openings in at least some of the tubular members is at least partly covered by a connecting web projecting parallel to the circumferential surface of said roller.

6. The improvement according to claim 5, wherein the edge of the connecting web is bent to project into the hollow rib to form troughs.

7. The improvement according to claim 5, wherein at least one of the openings is limited by a collecting web projecting circumferentially into the interior of the hollow tubular member approximately parallel to the surface of said roller to form a pocket in said cavity.

8. The improvement according to claim 1, wherein the ribs extend parallel to the axis of the roller.

* * * * *